(12) United States Patent
Koh et al.

(10) Patent No.: US 7,106,583 B2
(45) Date of Patent: Sep. 12, 2006

(54) EMBEDDED TYPE DISK DRIVE MOUNTING STRUCTURE

(75) Inventors: Jeong-seok Koh, Yongin-si (KR); Min-pyo Hong, Suwon-si (KR); Yong-kyu Byun, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 10/886,699

(22) Filed: Jul. 9, 2004

(65) Prior Publication Data

US 2005/0047077 A1 Mar. 3, 2005

(30) Foreign Application Priority Data

Aug. 25, 2003 (KR) .................. 10-2003-0058784

(51) Int. Cl.
*H05K 7/12* (2006.01)
*F16M 13/02* (2006.01)

(52) U.S. Cl. ............................ 361/685; 248/633

(58) Field of Classification Search ............... 361/684, 361/685, 724, 725, 727; 248/632, 633, 634, 248/636, 638, 615
See application file for complete search history.

(56) References Cited

U.S. PATENT DOCUMENTS

| | | | | |
|---|---|---|---|---|
| 5,402,308 A | * | 3/1995 | Koyanagi et al. ............ 361/685 |
| 5,535,092 A | * | 7/1996 | Bang ............................ 361/685 |
| 5,673,158 A | * | 9/1997 | Ichimura .................. 360/97.01 |
| 6,283,438 B1 | * | 9/2001 | Shimada et al. ............. 248/694 |
| 6,445,587 B1 | * | 9/2002 | Pavol .......................... 361/727 |
| 6,496,362 B1 | * | 12/2002 | Osterhout et al. ........... 361/685 |
| 6,571,898 B1 | * | 6/2003 | Guyomard ................. 180/68.4 |
| 6,661,604 B1 | * | 12/2003 | Hashizume et al. ...... 360/97.02 |
| 2002/0044416 A1 | * | 4/2002 | Harmon et al. ............. 361/685 |
| 2003/0174464 A1 | * | 9/2003 | Funawatari et al. ........ 361/685 |
| 2004/0032711 A1 | * | 2/2004 | Kaczeus et al. ............. 361/685 |

FOREIGN PATENT DOCUMENTS

| | | |
|---|---|---|
| JP | 7093963 A | 4/1995 |
| JP | 2001035062 A | 2/2001 |
| KR | 1020020054461 A | 7/2002 |

* cited by examiner

*Primary Examiner*—Lisa Lea-Edmonds
*Assistant Examiner*—Corey Broussard
(74) *Attorney, Agent, or Firm*—Sughrue Mion, PLLC

(57) ABSTRACT

Provided is a structure for mounting an embedded type disk drive in an electronic system having opposite surfaces corresponding to both surfaces of the disk drive. The structure includes a mounting damper coupled to a corner portion of the disk drive to protrude from either surface of the disk drive, and a mounting groove formed in each of the opposite surfaces of the electronic system at a position corresponding to the mounting damper. As the mounting damper is inserted in the mounting groove, the disk drive is mounted in the electronic system.

33 Claims, 6 Drawing Sheets

EMBEDDED TYPE DISK DRIVE MOUNTING STRUCTURE

BACKGROUND OF THE INVENTION

This application claims the priority of Korean Patent Application No. 2003-58784, filed on Aug. 25, 2003, in the Korean Intellectual Property Office, the disclosure of which is incorporated herein in its entirety by reference.

1. Field of the Invention

The present invention relates to a structure for mounting an embedded type disk drive in an electronic system, and more particularly, to a structure for mounting an embedded type disk drive which can reduce an impact or vibration applied to the embedded type disk drive and make assembly, disassembly, and reassembly easy.

2. Description of the Related Art

A disk drive that is one of data storage devices reproduces data stored on a disk or records data on the disk. For example, in hard disk drives (HDDs), a read/write head mounted on an actuator reproduces or records data with respect to a disk while moving to a desired position in a state of being lifted to a predetermined height from a recording surface of the rotating disk.

In particular, portable electronic systems such as personal digital assistants (PDAs), camcorders, and MP3 players, adopt compact disk drives. Such mobile compact disk drives can be largely classified into a detachable type and an embedded type according to the mounting method. The detachable type disk drive is used when the disk drive needs to be frequently disassembled from the electronic system. Accordingly, since the disk drive must have a structure easy to insert in or be separated from the electronic system, the mounting structure thereof is relatively complicated. The embedded type disk drive is used for a case in which the disk drive does not need to be frequently separated from the electronic system. Thus, since the embedded type disk drive is fixed in the electronic system, it can be protected by a case of the electronic system and the mounting structure thereof is relatively simple.

The embedded type disk drive is normally coupled inside the electronic system by using screws. However, if the disk drive is directly mounted in the electronic system by using the screws, the external impact or vibration is directly transferred to the disk drive via the screws so that bearings of a spindle motor installed in the disk drive are damaged or the read/write head collides with the surface of the disk drive.

To prevent the above problems, a variety of vibration reduction structures are adopted in the disk drive, an example of which is shown in FIG. 1.

Referring to FIG. 1, a disk drive 10 includes a disk, a spindle motor to rotate the disk, a read/write head, and an actuator to move the head to a desired position on the disk. These elements are protected by being encompassed by a base 11 and a cover 12. A damper 13 for reducing external impact or vibration is provided at the respective corners of the base 11. A screw insertion hole 14 is formed in each damper 13. Thus, the disk drive 10 is fixedly mounted inside the electronic system by screws 15 which are inserted in the screw insertion holes 14.

In the conventional embedded disk drive 10 shown in FIG. 1, the external impact or vibration can be reduced by the damper 13 provided at each corner of the disk drive 10. However, since the disk drive 10 has a structure fixedly mounted inside the electronic system by using the screws 15, the impact or vibration can be directly transferred to the disk drive 10 via the screws 15. Also, since the size of the disk drive 10 is very small, the screws 15 used for mounting the disk drive 10 must be small accordingly. Since the small screws 15 are considerably expensive, the manufacturing cost of the disk drive 10 is raised. Furthermore, a relatively long time is used to couple the disk drive 10 by using the small screws 16.

When the embedded type disk drive 10 is separated from the electronic system, the screws 15 must be unscrewed, which takes a relatively long time in the mounting of the disk drive 10 in the electronic system.

SUMMARY OF THE INVENTION

To solve the above and/or other problems, the present invention provides a structure for mounting an embedded type disk drive which enables mounting of the disk drive in an electronic system without using screws so that a vibration of the disk drive is reduced and assembly and disassembly of the disk drive is improved.

According to an aspect of the present invention, a structure for mounting an embedded type disk drive in an electronic system having opposite surfaces corresponding to both surfaces of the disk drive comprises a mounting damper coupled to a corner portion of the disk drive to protrude from either surface of the disk drive, and a mounting groove formed in each of the opposite surfaces of the electronic system at a position corresponding to the mounting damper, in which, as the mounting damper is inserted in the mounting groove, the disk drive is mounted in the electronic system.

The mounting damper is attached to corner portions of both surfaces of the disk drive.

The mounting damper is attached at opposite side edge portions of each of both surfaces of the disk drive to be lengthy along the side edge portion.

The mounting damper is attached to both surfaces of the disk drive by using an adhesive or a double sided tape.

A height of the mounting damper is greater than a depth of a mounting groove.

An outer side surface of the mounting damper and an inner side surface of the mounting groove, which contact each other, are inclined.

The mounting damper comprises a coupling portion having a column shape and inserted in the coupling hole, and a mounting portion formed at both end portions of the coupling portion, protruding from both surfaces of the disk drive, and inserted in the mounting groove.

A sectional area of the mounting portion is larger than a sectional area of the coupling portion. A height of the mounting portion is greater than a depth of a mounting groove.

An outer side surface of the mounting portion and an inner side surface of the mounting groove, which contact each other, are inclined.

The mounting damper is formed of a viscoelastic material.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
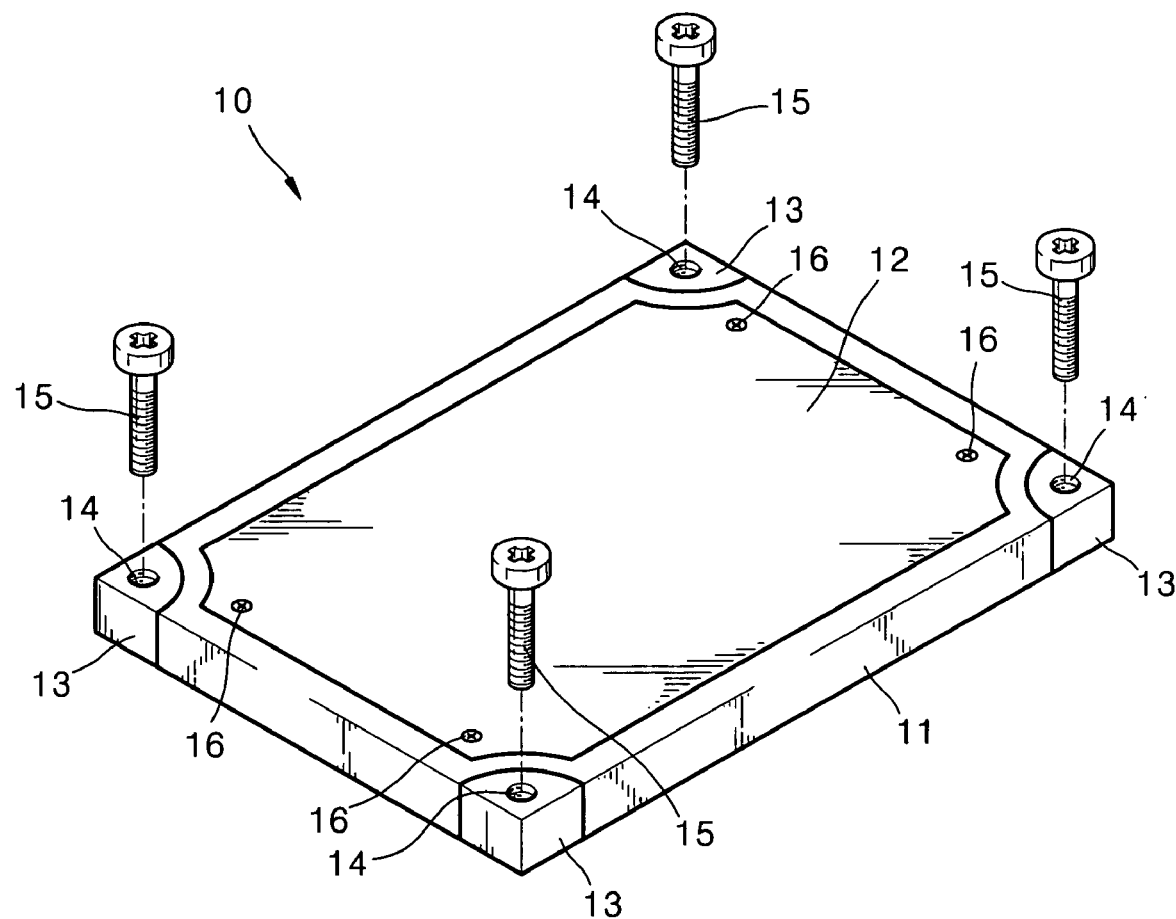
FIG. 1 is a perspective view illustrating the conventional embedded type disk drive.

With reference to the accompanying drawings, structures of mounting an embedded disk drive according to preferred embodiments of the present invention are described in detail. In the following descriptions and drawings, the same reference numerals indicate the same constituent elements.

Figure 2:
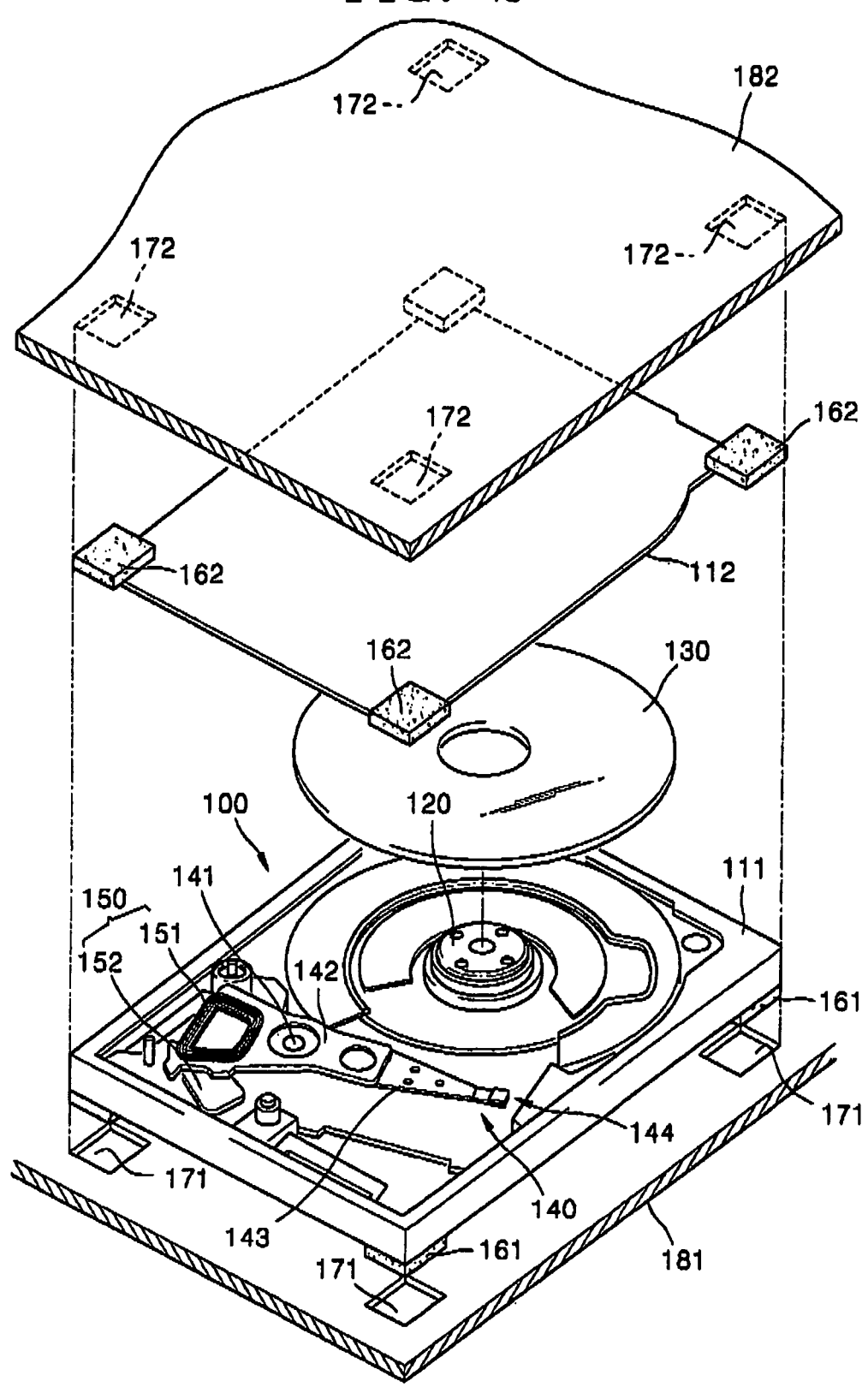
FIG. 2 is an exploded perspective view illustrating a structure for mounting a disk drive according to a first preferred embodiment of the present invention.
Figure 3:
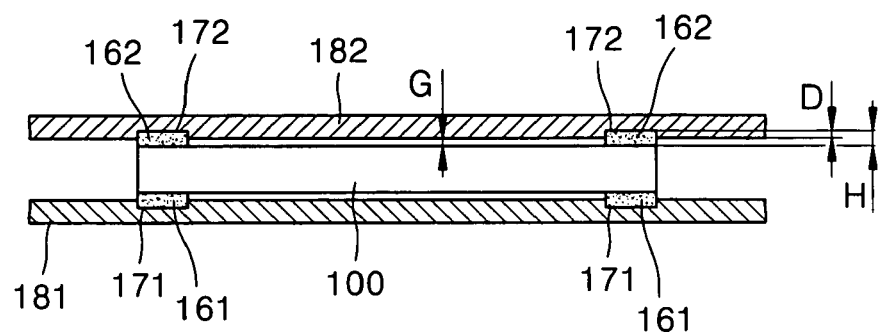
FIG. 3 is a sectional view illustrating a state in which the disk drive of FIG. 2 is mounted in the electronic system.

FIG. 2 shows a structure for mounting a disk drive according to a first preferred embodiment of the present invention. FIG. 3 shows a state in which the disk drive of FIG. 2 is mounted in the electronic system.

Referring to FIGS. 2 and 3, a disk drive 100 includes a base 111 and a cover 112. A spindle motor 120 to rotate a disk 130 and an actuator 140 to move a read/write head 144 to a desired position on the disk 130 are installed on the base 111. The cover 112 is coupled to the upper portion of the base 111 to encompass and protect the disk 130 and the actuator 140. The base 111 and the cover 112 are typically manufactured of aluminum.

The actuator 140 includes an actuator arm 142 rotatably coupled to an actuator pivot 141 installed on the base 111 of the disk drive 100 and a suspension 143 installed at an end portion of the actuator arm 142 and supporting the head 144 to be elastically biased toward a surface of the disk 130. The actuator 140 includes a voice coil motor (VCM) 150 to rotate the actuator arm 142. The voice coil motor 150 includes a VCM coil 151 coupled to the other end portion of the actuator arm 142 and a magnet 152 installed on the base 111 to face the VCM coil 151. The voice coil motor 150 is controlled by a servo control system. The actuator arm 142 is rotated in a direction following the Fleming's left hand rule by an interaction between current input to the VCM coil 151 and a magnetic field generated by the magnet 152. That is, when the power of the disk drive 100 is turned on and the disk 130 starts to rotate, the voice coil motor 150 rotates the actuator arm 142 counterclockwise to move the head 144 over a recording surface of the disk 130. On the contrary, when the power of the disk drive 100 is turned off and the disk 130 stops rotation, the voice coil motor 150 rotates the actuator arm 142 clockwise so that the head 144 moves away from the disk 130.

The disk drive 100 having the above structure is mounted in an electronic system, for example, PDAs, camcorders, or MP3 players. According to the present invention, the disk drive 100 is mounted with mounting dampers 161 and 162 inserted in mounting grooves 171 and 172, respectively. The mounting dampers 161 and 162 are coupled to the corners of the disk drive 100 to protrude from the opposite sides of the disk drive 100. The mounting grooves 171 and 172 are formed in the opposite inner surfaces of the electronic system corresponding to both surfaces of the disk drive 100. That is, according to the disk drive mounting structure of the present invention, as the mounting dampers 161 and 162 are inserted into the mounting grooves 171 and 712, the disk drive 100 is firmly mounted in the electronic system.

In detail, the mounting dampers 161 and 162 are attached on the opposite sides of the disk drive 100, that is, at the corners of a lower surface and an upper surface thereof. The shape of the mounting dampers 161 and 162 is rectangular as shown in the drawings, or can be circular or polygonal. The mounting dampers 161 and 162 can be attached to both surfaces of the disk drive 100 by using an adhesive or a double sided tape. The adhesive or double sided tape to be used has an adhesion strength and heat resistance such that the mounting dampers 161 and 162 are not separated from the surface of the disk drive 100 even if an impact or a vibration is applied, or a change in temperature occurs.

The mounting dampers 161 and 162 function to mount the disk drive 100 and absorb and/or reduce an impact or vibration transferred from the outside. To this end, the mounting dampers 161 and 162 are formed of a viscoelastic material exhibiting a superior shock or vibration absorption performance, for example, rubber or engineering plastic having a predetermined elasticity and flexibility.

The mounting grooves 171 and 172 are formed in the opposite inner surfaces of the electronic system corresponding to both sides of the disk drive 100, that is, the lower and upper surfaces thereof. The opposite surfaces of the electronic system may vary according to the structure of the electronic system and the position where the disk drive 100 is mounted. For example, the opposite surfaces of the electronic system may be an upper surface of a printed circuit board 181 installed in the electronic system and a lower surface of the case 182 of the electronic system. That is, the disk drive 100 is arranged between the printed circuit board 181 and the case 182 in the electronic system. The mounting groove 171 is formed in the upper surface of the printed circuit board 181 at a position corresponding to the mounting damper 161 attached to the lower surface of the disk drive 100. The mounting groove 172 is formed in the lower surface of the case 182 at a position corresponding to the mounting damper 162 attached to the upper surface of the disk drive 100. The mounting grooves 171 and 172 have the shape and size corresponding to those of the mounting dampers 161 and 162 so that the mounting dampers 161 and 162 are inserted therein. That is, as shown in the drawings, when the mounting dampers 161 and 162 are rectangular, the mounting grooves 171 and 172 are formed to have the same shape. When the mounting dampers 161 and 162 are circular or polygonal, the mounting grooves 171 and 172 are formed to have the same shape.

The height H of the mounting dampers 161 and 162 is preferably greater than the depth D of the mounting grooves 171 and 172. This is to form a predetermined gap G between the lower surface of the disk drive 100 and the upper surface of the printed circuit board 181 and between the upper surface of the disk drive 100 and the lower surface of the case 182, in a state in which the disk drive 100 is mounted in the electronic system as the mounting dampers 161 and 162 are inserted in the mounting grooves 171 and 172. Accordingly, since both surfaces of the disk drive 100 do not contact the opposite surfaces of the electronic system, the external impact or vibration is not directly transferred to the disk drive 100 via the opposite surfaces of the electronic system.

According to the structure for mounting a disk drive according to the present invention, the disk drive 100 is mounted in the electronic system as follows.

First, the case 182 of the electronic system is open, the mounting damper 161 attached on the lower surface of the disk drive 100 is inserted in the mounting groove 171 formed in the upper surface of the printed circuit board 181 so that the disk drive 100 is mounted on the printed circuit board 181. As the case 182 is closed, the mounting damper 162 attached on the upper surface of the disk drive 100 is inserted in the mounting groove 172 formed in the lower surface of the case 182. Accordingly, the disk drive 100 is firmly mounted between the printed circuit board 181 and the case 182 of the electronic system.

As described above, according to the present invention, the disk drive 100 can be easily and firmly mounted in the electronic system without using the conventional screws. Thus, the assembly time and the manufacturing cost of the disk drive 100 can be reduced. Also, the disk drive 100 can be easily disassembled by simply opening the case 181 and reassembly of the disk drive 100 can be easily carried out. According to the disk drive mounting structure according to the present invention, the assembly, disassembly, and reassembly of the disk drive 100 are improved. Furthermore, the impact and vibration applied from the outside can be reduced by the mounting dampers 161 and 162. Thus, the head 144, the surface of the disk 130, and the bearings of the spindle motor 120 are prevented from being damaged by the external impact or vibration so that performance and reliability of the disk drive 100 are improved.

Figure 7:
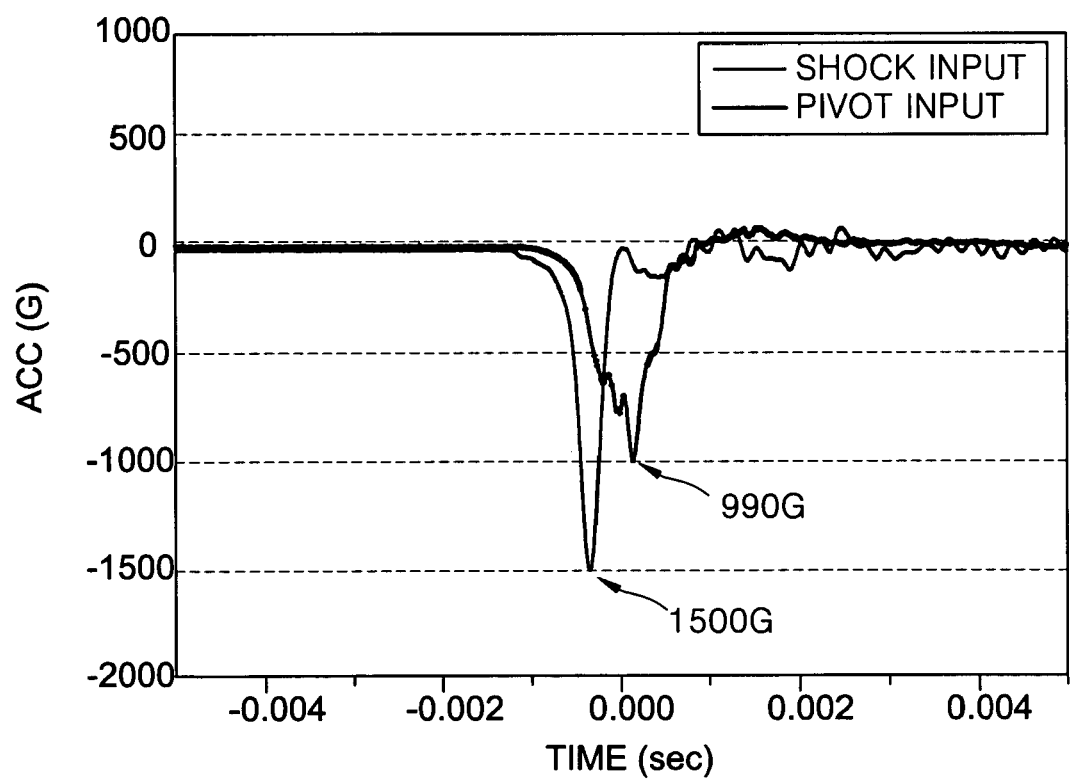
FIG. 7 is a graph showing the result of a test of anti-shock performance of the mounting damper in the mounting structure according to the first preferred embodiment shown in FIGS. 2 and 3.

FIG. 7 shows the result of a test of anti-shock performance of the mounting damper in the mounting structure according to the first preferred embodiment shown in FIGS. 2 and 3. A 4 mm thick rubber is used as the mounting damper in the test. In the test, a high impact input of 1500 G is applied to the electronic system in which the disk drive is mounted and a pivot input applied to the disk drive is measured. In the graph of FIG. 7, when a high impact input of 1500 G is applied to the electronic system, the actual pivot input applied to the disk drive is lowered to about 990 G. This signifies that the impact input is reduced by about 34% by the mounting dampers. Thus, the bearings of the spindle motor, the head, and the disk installed in the disk drive can be protected from the external impact or vibration.

Figure 4:
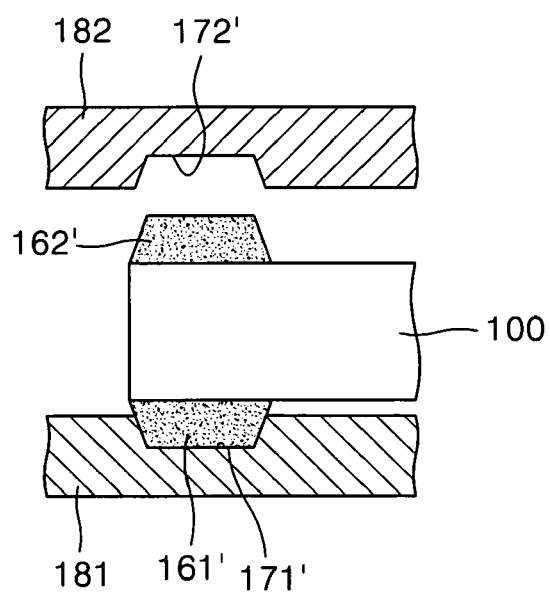
FIG. 4 is a magnified sectional view illustrating a modified example of the mounting damper and the mounting groove shown in FIGS. 2 and 3.

FIG. 4 shows a modified example of the mounting damper and the mounting groove shown in FIGS. 2 and 3. Referring to FIG. 4, the outer side surfaces of mounting dampers 161' and 162' which are attached on the opposite surfaces of the disk drive 100 are inclined. The inner side surfaces of mounting grooves 171' and 172' formed in an upper surface of the printed circuit board 181 and a lower surface of the case 182 are inclined. Also, the inclination angles and directions of the outer side surfaces of the mounting dampers 161' and 162' and the inner side surfaces of the mounting grooves 171' and 172', which contact one another, are substantially the same.

As described above, when the outer side surfaces of the mounting dampers 161' and 162' and the inner side surfaces of the mounting grooves 171' and 172' are inclined, the mounting dampers 161' and 162' are easily inserted in the mounting grooves 171' and 172', respectively. Also, since the outer side surfaces of the mounting dampers 161' and 162' contact closely the inner side surfaces of the mounting grooves 171' and 172', the disk drive 100 is more firmly mounted.

Figure 5:
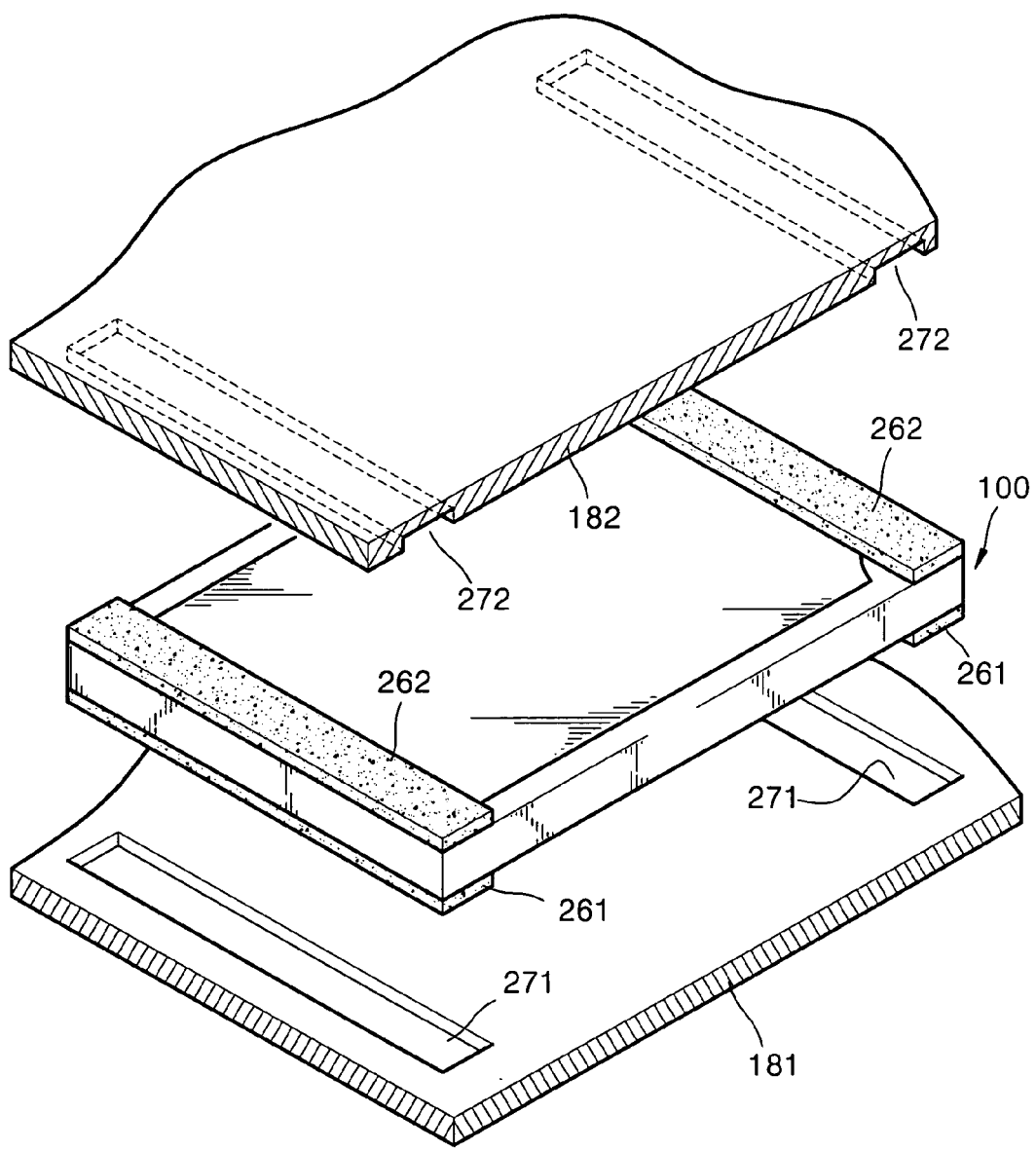
FIG. 5 is an exploded perspective view illustrating a structure for mounting a disk drive according to a second preferred embodiment of the present invention.

FIG. 5 shows a structure for mounting a disk drive according to a second preferred embodiment of the present invention. Referring to FIG. 5, the disk drive mounting structure according to a second preferred embodiment of the present invention includes mounting dampers 261 and 262 attached on both surfaces of the disk drive 100 and mounting grooves 271 and 272 formed in the corresponding surfaces of the electronic system.

In detail, the mounting dampers 261 and 262 are attached to the opposite end portions of either surface of the disk drive 100 to be lengthy along the side edges. That is, the mounting dampers 261 and 262 have a long stick shape. The mounting grooves 271 and 272 are formed at positions corresponding to the mounting dampers 261 and 262 in the upper surface of the printed circuit board 181 and the lower surface of the case 182. The mounting grooves 271 and 272 have the shapes and sizes corresponding to those of the mounting dampers 261 and 262 so that the mounting dampers 261 and 262 are inserted in the mounting grooves 271 and 272, respectively.

The mounting dampers 261 and 262 can be formed of a viscoelastic material. The height of the mounting dampers 261 and 262 is preferably greater than the depth of the mounting groove 271 and 272. The outer surfaces of the mounting dampers 261 and 262 and the inner surfaces of the mounting grooves 271 and 272 are inclined as shown in FIG. 4. Since the features and effects of the disk drive mounting structure according to the second preferred embodiment of the present invention are the same as those according to the above-described first preferred embodiment of the present invention, detailed descriptions thereof will be omitted.

Figure 6:
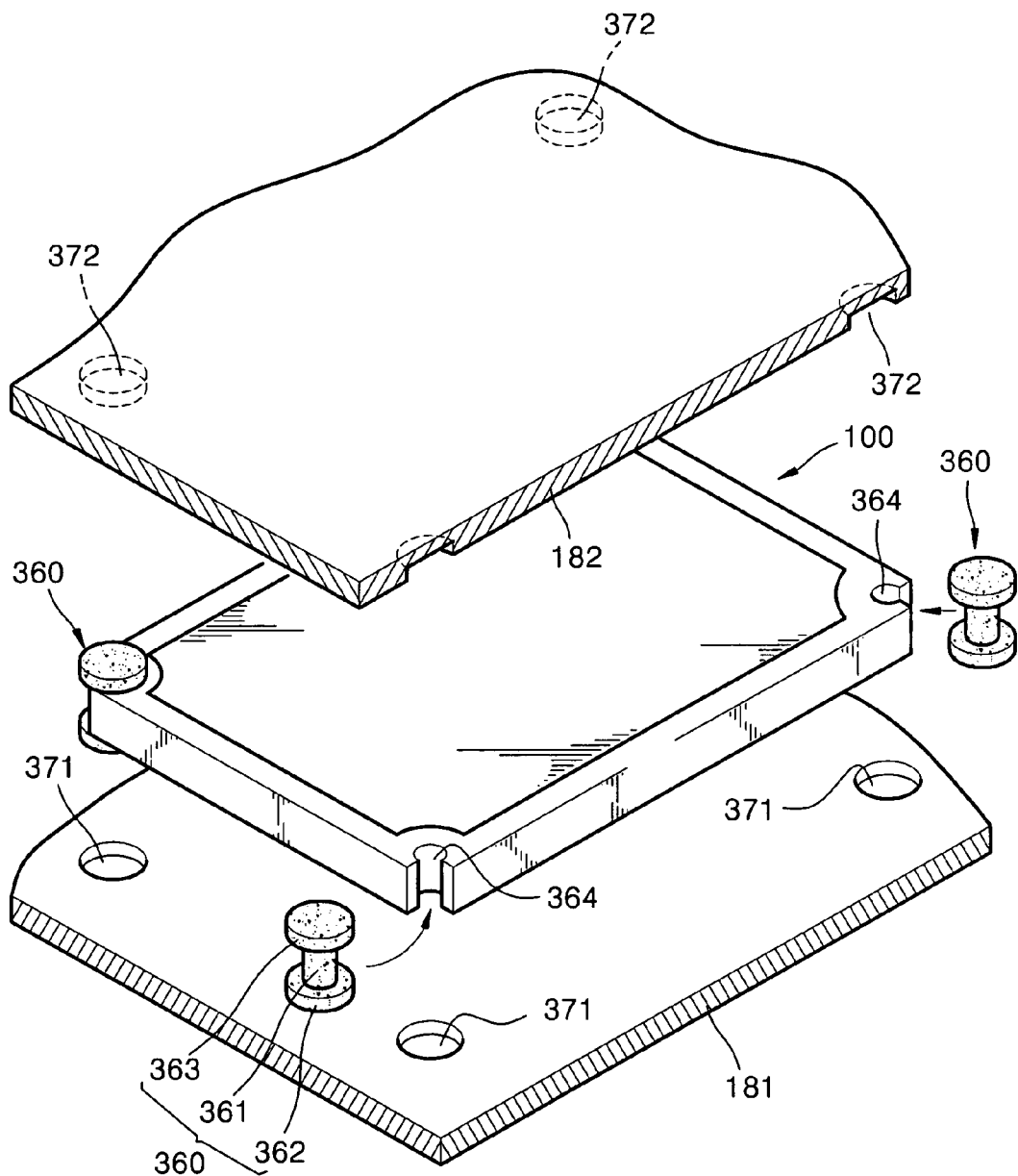
FIG. 6 is an exploded perspective view illustrating a structure for mounting a disk drive according to a third preferred embodiment of the present invention.

FIG. 6 shows a structure for mounting a disk drive according to a third preferred embodiment of the present invention. Referring to FIG. 6, a structure for mounting a disk drive according to a third preferred embodiment of the present invention includes a mounting damper 360 coupled to each corner portion of the disk drive 100 and mounting grooves 371 and 372 formed in the opposite inner surfaces of the electronic system.

In detail, a coupling hole 364 which is open outwardly is formed at each corner of the disk drive 100. The mounting damper 360 is inserted in the coupling hole 364. To this end, the mounting damper 360 includes a coupling portion 361 having a column shape and inserted in the coupling hole 364 and mounting portions 362 and 363 formed at both end portions of the coupling portion 361 and protruding from both surfaces of the disk drive 100. The coupling hole 364 may have a circular sectional shape. Accordingly, the coupling portion 361 of the mounting damper 360 can be formed to have a circular column shape. Although the mounting portions 362 and 363 have a circular shape in the drawing, they may have a rectangular or polygonal shape. The sectional area of each of the mounting portion 362 and 363 is preferably greater than that of the coupling portion 361. Thus, in the state in which the coupling portion 361 is inserted in the coupling hole 364, the mounting damper 360 is prevented from moving up and down. Also, since a contact area between the mounting portions 362 and 363 and the mounting grooves 371 and 372 increases, a firmer mounting structure is possible. The mounting damper 360 having the above structure can be formed of a viscoelastic material as in the above-described preferred embodiments.

The mounting grooves 371 and 372 are formed at positions corresponding the mounting portions 362 and 363 of the mounting damper 360 on the upper surface of the printed circuit board 181 and the lower surface of the case 182. The mounting grooves 371 and 372 are formed to have a shape and size corresponding to those of the mounting portions 362 and 363 so that the mounting portions 362 and 363 of the mounting damper 360 are inserted therein.

According to the structure for mounting a disk drive according to the third preferred embodiment of the present invention, unlike the previous preferred embodiments, the mounting damper 360 is not attached to both surfaces of the disk drive 100, but detachably coupled to the corner portion of the disk drive 100.

The height of the mounting portions 362 and 363 is preferably greater than the depth of the mounting grooves 371 and 372. The outer side surfaces of the mounting portions 362 and 363 and the inner side surfaces of the mounting grooves 371 and 372 may be inclined as shown in FIG. 4. Since the features and effects of the disk drive mounting structure according to the third preferred embodiment of the present invention are the same as those according to the above-described preferred embodiment of the present invention, detailed descriptions thereof will be omitted.

As described above, according to the disk drive mounting structure according to the present invention, the disk drive can be easily mounted in the electronic system without using screws and an external impact or vibration applied to the disk drive can be reduced. Thus, assembly, disassembly, and reassembly of the disk drive are made easy, a manufacturing cost is reduced, and performance of the disk drive is improved as the external impact or vibration is reduced.

Also, by adjusting the depth of the mounting groove, the height of the mounting damper can be sufficiently obtained so that the shock and vibration reduction feature of the mounting damper can be improved.

While this invention has been particularly shown and described with reference to preferred embodiments thereof, it will be understood by those skilled in the art that various changes in form and details may be made therein without departing from the spirit and scope of the invention as defined by the appended claims. For example, although in the above descriptions the mounting structure is applied to the hard disk drive, it can be applied to a variety of disk drives including an optical disk drive. Also, the shapes and positions of the mounting dampers and the mounting grooves can be changed within a scope of satisfying the respective functions thereof.

What is claimed is:

1. A structure for mounting an embedded type disk drive in an electronic system having surfaces corresponding to surfaces of the disk drive, the structure comprising:
   a mounting damper coupled to a portion of the disk drive to protrude from at least one of said surfaces of the disk drive; and
   a mounting groove formed in at least one of the surfaces of the electronic system at a position corresponding to the mounting damper, said mounting groove having a continuous edge surface which surrounds said mounting damper,
   wherein said continuous edge surface of said mounting groove is positioned inward on said at least one of said surfaces from each adjacent edge surface of said at least one of said surfaces, and
   wherein, when the mounting damper is inserted in the mounting groove, the disk drive is mounted in the electronic system.

2. The structure as claimed in claim 1, further comprising a plurality of said mounting dampers and wherein said plurality of said mounting dampers are attached to a plurality of portions of said surfaces of the disk drive.

3. The structure as claimed in claim 1, wherein the mounting damper is attached to said portion of the disk drive by using an adhesive or a double sided tape.

4. The structure as claimed in claim 1, wherein a height of the mounting damper is greater than a depth of said mounting groove.

5. The structure as claimed in claim 1, wherein an outer side surface of the mounting damper and an inner side surface of the mounting groove are inclined.

6. The structure as claimed in claim 1, wherein the portion of the disk drive is a side edge portion of said at least one of said surfaces, and said mounting damper extends along a length of the side edge portion.

7. The structure as claimed in claim 6, wherein the mounting damper is attached to the side edge portion of the disk drive by an adhesive or a double-sided tape.

8. The structure as claimed in claim 6, wherein a height of the mounting damper is greater than a depth of said mounting groove.

9. The structure as claimed in claim 6, wherein an outer side surface of the mounting damper and an inner side surface of the mounting groove are inclined.

10. The structure as claimed in claim 1, wherein a coupling hole is formed at said portion of the disk drive and the mounting damper is inserted in the coupling hole.

11. The structure as claimed in claim 10, wherein the mounting damper comprises:
    a coupling portion having a column shape and inserted in the coupling hole; and
    at least one mounting portion formed on at least one end portion of the coupling portion, protruding from said at least one surface of the disk drive, and inserted in the mounting groove.

12. The structure as claimed in claim 11, wherein a sectional area of the at least one mounting portion is larger than a sectional area of the coupling portion.

13. The structure as claimed in claim 11, wherein a height of the at least one mounting portion is greater than a depth of said mounting groove.

14. The structure as claimed in claim 11, wherein an outer side surface of the at least one mounting portion and an inner side surface of the mounting groove are inclined.

15. The structure as claimed in claim 1, wherein the mounting damper is formed of a viscoelastic material.

16. The structure as claimed in claim 1, wherein said portion of the disk drive is a corner portion.

17. The structure as claimed in claim 1, wherein said surfaces of said electronic system are positioned opposite to each other and each of said surfaces of said disk drive correspond to one of said surfaces of said electronic system, respectively.

18. The structure as claimed in claim 2, wherein each of said portions are corner portions.

19. The structure as claimed in claim 5, wherein said outer side surface and said inner side surface contact each other.

20. The structure as claimed in claim 10, wherein said coupling hole is open outwardly with respect to said portion.

21. The structure as claimed in claim 10, wherein said portion at which said coupling hole is positioned is a corner portion.

22. The structure as claimed in claim 11, wherein mounting portions are formed on each end portion of said coupling portion, and each of the mounting portions protrudes from surfaces of said disk drive.

23. A structure for mounting an embedded type disk drive in an electronic system having surfaces corresponding to surfaces of the disk drive, the structure comprising:
   a plurality of mounting dampers coupled to portions of the disk drive to protrude from said surfaces of the disk drive; and
   a plurality of mounting grooves formed in the surfaces of the electronic system at positions corresponding to the mounting dampers, at least one of said mounting grooves having a continuous edge surface which surrounds a corresponding one of said plurality of mounting dampers,
   wherein said continuous edge surface of said at least one mounting groove is positioned inward on said at least one of said surfaces from each adjacent edge surface of said at least one of said surfaces, and
   wherein, when the mounting dampers are inserted in the mounting grooves, the disk drive is mounted in the electronic system.

24. The structure as claimed in claim 23, wherein the mounting dampers are formed of a viscoelastic material.

25. The structure as claimed in claim 23, wherein each of said portions are corners of said disk drive.

26. The structure as claimed in claim 23, wherein the mounting dampers are attached to said portions of the disk drive by an adhesive or a double-sided tape.

27. The structure as claimed in claim 23, wherein a height of the mounting dampers is greater than a depth of said mounting grooves.

28. The structure as claimed in claim 23, wherein an outer side surface of each of the mounting dampers and an inner side surface of each of the mounting grooves are inclined.

29. A structure for mounting an embedded type disk drive in an electronic system having surfaces corresponding to surfaces of the disk drive, the structure comprising:
   a mounting damper coupled to a portion of the disk drive to protrude from at least one of said surfaces of the disk drive; and
   a mounting groove formed in at least one of the surfaces of the electronic system at a position corresponding to the mounting damper,
   wherein said mounting groove is positioned inward on said at least one of said surfaces from each adjacent edge surface of said at least one of said surfaces,
   wherein, when the mounting damper is inserted in the mounting groove, the disk drive is mounted in the electronic system, and
   wherein an outer side surface of the mounting damper and an inner side surface of the mounting groove are inclined such that the mounting damper has a decreased width in a direction away from the disk drive.

30. A structure for mounting an embedded type disk drive in an electronic system having surfaces corresponding to surfaces of the disk drive, the structure comprising:
   a mounting damper coupled to a portion of the disk drive to protrude from at least one of said surfaces of the disk drive; and
   a mounting groove formed in at least one of the surfaces of the electronic system at a position corresponding to the mounting damper,
   wherein said mounting groove is positioned inward on said at least one of said surfaces from each adjacent edge surface of said at least one of said surfaces,
   wherein, when the mounting damper is inserted in the mounting groove, the disk drive is mounted in the electronic system, and
   wherein a coupling hole, is formed at said portion of the disk drive and the mounting damper is inserted in the coupling hole, such that the mounting damper has a portion which is wider than the coupling hole.

31. The structure as claimed in claim 30, wherein the mounting damper comprises:
   a coupling portion having a column shape and inserted in the coupling hole; and
   at least one mounting portion formed on at least one end portion of the coupling portion, protruding from said at least one surface of the disk drive, and inserted in the mounting groove.

32. The structure as claimed in claim 31 wherein a sectional area of the at least one mounting portion is larger than a sectional area of the coupling portion.

33. The structure as claimed in claim 31, wherein mounting portions are formed on each end portion of said coupling portion, and each of the mounting portions protrudes from surfaces of said disk drive.

* * * * *